US010547422B2

(12) United States Patent
Yoo et al.

(10) Patent No.: US 10,547,422 B2
(45) Date of Patent: Jan. 28, 2020

(54) SRS TRANSMISSION WITH IMPLIED RTS/CTS

(71) Applicant: QUALCOMM Incorporated, San Diego, CA (US)

(72) Inventors: Taesang Yoo, San Diego, CA (US); Xiaoxia Zhang, San Diego, CA (US); Seyed Ali Akbar Fakoorian, San Diego, CA (US); Ahmed Kamel Sadek, San Diego, CA (US); Siddhartha Mallik, San Diego, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 13 days.

(21) Appl. No.: 15/725,762

(22) Filed: Oct. 5, 2017

(65) Prior Publication Data
US 2018/0302201 A1 Oct. 18, 2018

Related U.S. Application Data

(60) Provisional application No. 62/485,288, filed on Apr. 13, 2017.

(51) Int. Cl.
*H04L 5/00* (2006.01)
*H04W 74/08* (2009.01)

(52) U.S. Cl.
CPC ....... *H04L 5/0048* (2013.01); *H04W 74/0816* (2013.01); *H04W 74/085* (2013.01)

(58) Field of Classification Search
CPC combination set(s) only.
See application file for complete search history.

(56) References Cited

U.S. PATENT DOCUMENTS

2008/0267165 A1* 10/2008 Bertrand ........... H04W 56/0005
370/350
2011/0274063 A1* 11/2011 Li ......................... H04L 5/001
370/329

(Continued)

FOREIGN PATENT DOCUMENTS

WO    WO-2017107054 A1    6/2017

OTHER PUBLICATIONS

"3rd Generation Partnership Project; Technical Specification Group Radio Access Network; Evolved Universal Terrestrial Radio Access (E-UTRA); Physical Layer Procedures (Release 11)", 3GPP Standard; 3GPP TS 36.213, 3rd Generation Partnership Project (3GPP), Mobile Competence Centre; 650, Route Des Lucioles; F-06921 Sophia-Antipolis Cedex; France, vol. RAN WG1, No. V11.1.0, Dec. 20, 2012 (Dec. 20, 2012), pp. 1-160, XP050691223, [retrieved on Dec. 20, 2012], Chapter 4; Chapter 5.1.

*Primary Examiner* — Warner Wong
(74) *Attorney, Agent, or Firm* — Norton Rose Fulbright US LLP

(57) ABSTRACT

Sounding reference signal (SRS) transmission with implied request-to-send (RTS)/clear-to-send (CTS) operations is discussed. Two different types of SRS are defined, a legacy SRS associated with channel measurement sounding, and a contention SRS associated with contention resolution for medium sharing. The type of SRS may be distinguished based on the SRS resource associated with the particular type. Thus, legacy SRS are assigned to one SRS resource, while contention SRS are assigned to separate SRS resources. Therefore, when a neighbor node detects an SRS associated with the SRS resource for contention-type SRS, the neighbor node may know to refrain from transmission or to adjust or modify its communications depending on a spatial direction of the contention SRS.

30 Claims, 9 Drawing Sheets

(56) References Cited

U.S. PATENT DOCUMENTS

| | | | |
|---|---|---|---|
| 2011/0310818 A1* | 12/2011 | Lin | H04L 5/0048 370/329 |
| 2012/0044906 A1* | 2/2012 | Chen | H04L 5/001 370/329 |
| 2012/0082124 A1* | 4/2012 | Kwon | H04L 5/0007 370/329 |
| 2012/0170497 A1* | 7/2012 | Zhang | H04W 76/28 370/311 |
| 2013/0040689 A1* | 2/2013 | Iwai | H04W 52/16 455/522 |
| 2013/0272170 A1* | 10/2013 | Chatterjee | H04W 28/02 370/280 |
| 2014/0112168 A1* | 4/2014 | Chen | H04B 7/0413 370/252 |
| 2014/0269451 A1* | 9/2014 | Papasakellariou | H04B 7/2656 370/280 |
| 2015/0223085 A1* | 8/2015 | Siomina | H04W 52/0206 370/252 |
| 2016/0197712 A1* | 7/2016 | Sorrentino | H04L 5/0051 370/336 |
| 2016/0295575 A1* | 10/2016 | Dinan | H04L 1/1812 |
| 2016/0301515 A1* | 10/2016 | Ouchi | H04L 5/0057 |
| 2017/0033908 A1* | 2/2017 | Hwang | H04L 5/00 |
| 2017/0126439 A1* | 5/2017 | Yoshimoto | H04W 24/10 |
| 2017/0208568 A1* | 7/2017 | Nam | H04W 72/042 |
| 2017/0215200 A1* | 7/2017 | Mallik | H04W 72/1268 |
| 2017/0251497 A1* | 8/2017 | Larsson | H04W 74/0816 |
| 2017/0264402 A1* | 9/2017 | Papasakellariou | H04B 7/04 |
| 2017/0264409 A1* | 9/2017 | Guo | H04B 7/0413 |
| 2017/0288833 A1* | 10/2017 | Islam | H04L 5/0048 |
| 2017/0325172 A1* | 11/2017 | Dinan | H04W 52/14 |
| 2017/0325175 A1* | 11/2017 | Dinan | H04W 52/146 |
| 2018/0183552 A1* | 6/2018 | Hosseini | H04L 5/0048 |
| 2018/0302201 A1* | 10/2018 | Yoo | H04L 5/0048 |
| 2018/0331741 A1* | 11/2018 | Murakami | H04B 7/0617 |
| 2018/0331749 A1 | 11/2018 | Ghosh et al. | |

* cited by examiner

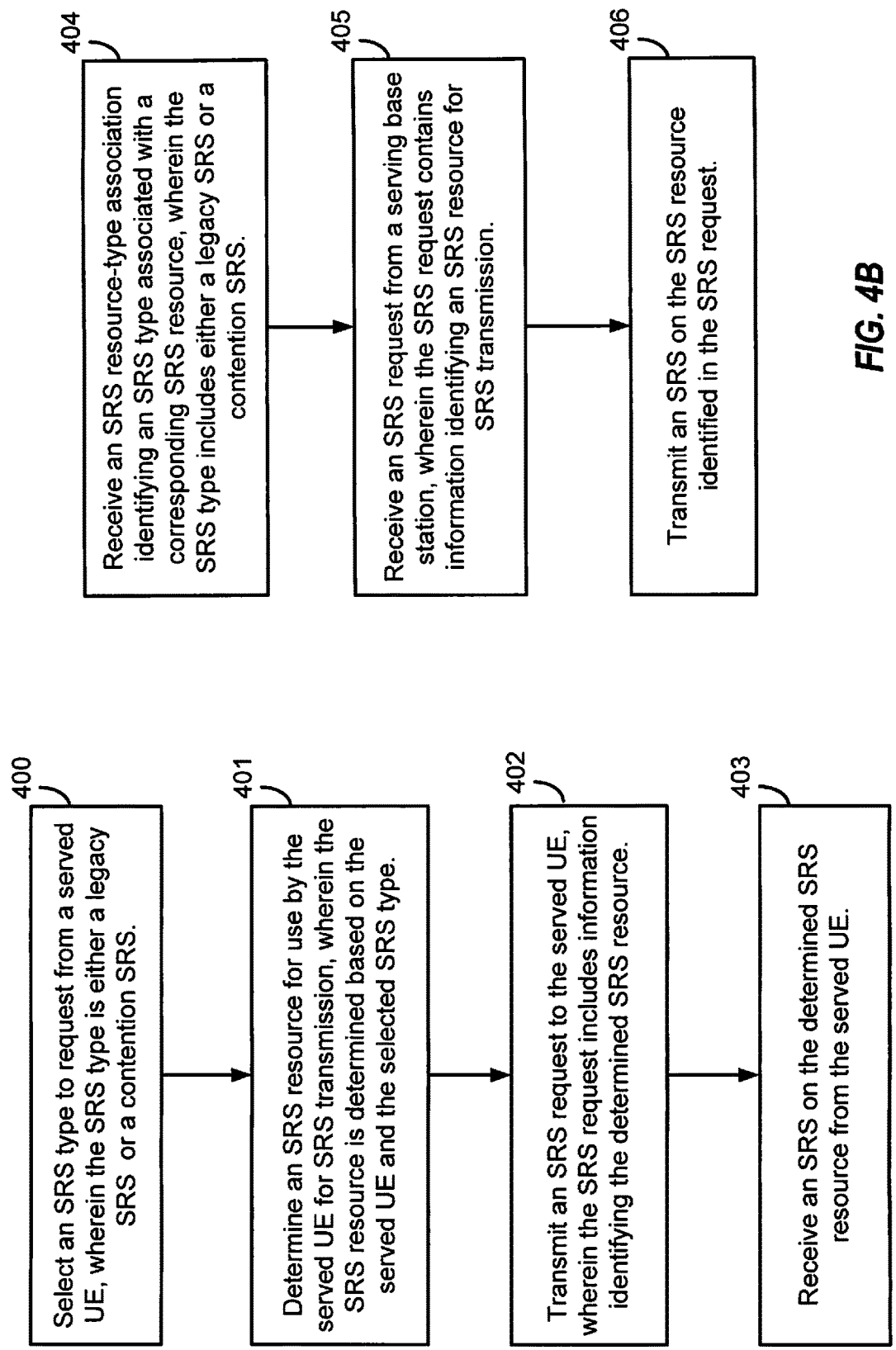

SRS TRANSMISSION WITH IMPLIED RTS/CTS

CROSS-REFERENCE TO RELATED APPLICATIONS

This application claims the benefit of U.S. Provisional Patent Application No. 62/485,288, entitled, "SRS TRANSMISSION WITH IMPLIED RTS/CTS," filed on Apr. 13, 2017, which is expressly incorporated by reference herein in its entirety.

BACKGROUND

Field

Aspects of the present disclosure relate generally to wireless communication systems, and more particularly, to transmission of sounding reference signals (SRS) with implied request to send (RTS)/clear to send (CTS) functionality.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

In one aspect of the disclosure, a method of wireless communication includes selecting, by a base station, a sounding reference signal (SRS) type to request from a served user equipment (UE), wherein the SRS type includes one of: a legacy SRS associated with channel measurement sounding, or a contention SRS associated with contention resolution for medium sharing, determining, by the base station, an SRS resource for use by the served UE for SRS transmission, wherein the SRS resource is determined based on the served UE and the selected SRS type, and transmitting, by the base station, an SRS request to the served UE, wherein the SRS request includes information identifying the determined SRS resource.

In an additional aspect of the disclosure, a method of wireless communication includes receiving, at a UE, an SRS resource-type association identifying an SRS type associated with a corresponding SRS resource, wherein the SRS type includes one of: a legacy SRS associated with channel measurement sounding, or a contention SRS associated with contention resolution for medium sharing, receiving, at the UE, an SRS request from a serving base station, wherein the SRS request contains information identifying an SRS resource for SRS transmission, and transmitting, by the UE, an SRS on the SRS resource identified in the SRS request.

In an additional aspect of the disclosure, a method of wireless communications includes detecting, at a network node, one or more SRS from one or more non-served UE, determining, by the network node, whether the one or more SRS correspond to one of: legacy SRS associated with channel measurement sounding, or contention SRS associated with contention resolution for medium sharing, wherein the determining is based on an SRS resource carrying the one or more SRS, conducting communications without modification, by the network node, with another network node based on determining the one or more SRS correspond to the legacy SRS, and modifying communications, by the network node, with the another network node based on determining the one or more SRS correspond to the contention SRS.

In an additional aspect of the disclosure, an apparatus configured for wireless communication includes means for selecting, by a base station, an SRS type to request from a served UE, wherein the SRS type includes one of: a legacy SRS associated with channel measurement sounding, or a contention SRS associated with contention resolution for medium sharing, means for determining, by the base station, an SRS resource for use by the served UE for SRS transmission, wherein the SRS resource is determined based on the served UE and the selected SRS type, and means for transmitting, by the base station, an SRS request to the served UE, wherein the SRS request includes information identifying the determined SRS resource.

In an additional aspect of the disclosure, an apparatus configured for wireless communication includes means for receiving, at a UE, an SRS resource-type association identifying an SRS type associated with a corresponding SRS resource, wherein the SRS type includes one of: a legacy SRS associated with channel measurement sounding, or a contention SRS associated with contention resolution for medium sharing, means for receiving, at the UE, an SRS request from a serving base station, wherein the SRS request contains information identifying an SRS resource for SRS transmission, and means for transmitting, by the UE, an SRS on the SRS resource identified in the SRS request.

In an additional aspect of the disclosure, an apparatus configured for wireless communication includes means for detecting, at a network node, one or more SRS from one or more non-served UE, means for determining, by the network node, whether the one or more SRS correspond to one of: legacy SRS associated with channel measurement sounding, or contention SRS associated with contention resolution for medium sharing, wherein the determining is based on an SRS resource carrying the one or more SRS, means for conducting communications without modification, by the network node, with another network node based on determining the one or more SRS correspond to the legacy SRS, and means for modifying communications, by the network node, with the another network node based on determining the one or more SRS correspond to the contention SRS.

In an additional aspect of the disclosure, a non-transitory computer-readable medium having program code recorded thereon. The program code further includes code to select, by a base station, an SRS type to request from a served UE, wherein the SRS type includes one of: a legacy SRS associated with channel measurement sounding, or a contention SRS associated with contention resolution for medium sharing, code to determine, by the base station, an SRS resource for use by the served UE for SRS transmission, wherein the SRS resource is determined based on the served UE and the selected SRS type, and code to transmit, by the base station, an SRS request to the served UE, wherein the SRS request includes information identifying the determined SRS resource.

In an additional aspect of the disclosure, a non-transitory computer-readable medium having program code recorded thereon. The program code further includes code to receive, at a UE, an SRS resource-type association identifying an SRS type associated with a corresponding SRS resource, wherein the SRS type includes one of: a legacy SRS associated with channel measurement sounding, or a contention SRS associated with contention resolution for medium sharing, code to receive, at the UE, an SRS request from a serving base station, wherein the SRS request contains information identifying an SRS resource for SRS transmission, and code to transmit, by the UE, an SRS on the SRS resource identified in the SRS request.

In an additional aspect of the disclosure, a non-transitory computer-readable medium having program code recorded thereon. The program code further includes code to detect, at a network node, one or more SRS from one or more non-served UE, code to determine, by the network node, whether the one or more SRS correspond to one of: legacy SRS associated with channel measurement sounding, or contention SRS associated with contention resolution for medium sharing, wherein the determining is based on an SRS resource carrying the one or more SRS, code to conduct communications without modification, by the network node, with another network node based on determining the one or more SRS correspond to the legacy SRS, and code to modify communications, by the network node, with the another network node based on determining the one or more SRS correspond to the contention SRS.

In an additional aspect of the disclosure, an apparatus configured for wireless communication is disclosed. The apparatus includes at least one processor, and a memory coupled to the processor. The processor is configured to select, by a base station, an SRS type to request from a served UE, wherein the SRS type includes one of: a legacy SRS associated with channel measurement sounding, or a contention SRS associated with contention resolution for medium sharing, to determine, by the base station, an SRS resource for use by the served UE for SRS transmission, wherein the SRS resource is determined based on the served UE and the selected SRS type, and to transmit, by the base station, an SRS request to the served UE, wherein the SRS request includes information identifying the determined SRS resource.

In an additional aspect of the disclosure, an apparatus configured for wireless communication is disclosed. The apparatus includes at least one processor, and a memory coupled to the processor. The processor is configured to receive, at a UE, an SRS resource-type association identifying an SRS type associated with a corresponding SRS resource, wherein the SRS type includes one of: a legacy SRS associated with channel measurement sounding, or a contention SRS associated with contention resolution for medium sharing, to receive, at the UE, an SRS request from a serving base station, wherein the SRS request contains information identifying an SRS resource for SRS transmission, and to transmit, by the UE, an SRS on the SRS resource identified in the SRS request.

In an additional aspect of the disclosure, an apparatus configured for wireless communication is disclosed. The apparatus includes at least one processor, and a memory coupled to the processor. The processor is configured to detect, at a network node, one or more SRS from one or more non-served UE, code to determine, by the network node, whether the one or more SRS correspond to one of: legacy SRS associated with channel measurement sounding, or contention SRS associated with contention resolution for medium sharing, wherein the determining is based on an SRS resource carrying the one or more SRS, to conduct communications without modification, by the network node, with another network node based on determining the one or more SRS correspond to the legacy SRS, and to modify communications, by the network node, with the another network node based on determining the one or more SRS correspond to the contention SRS.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIGS. 4A-4C are block diagrams illustrating example blocks executed to implement aspects of the present disclosure.

DETAILED DESCRIPTION

Figure 1:
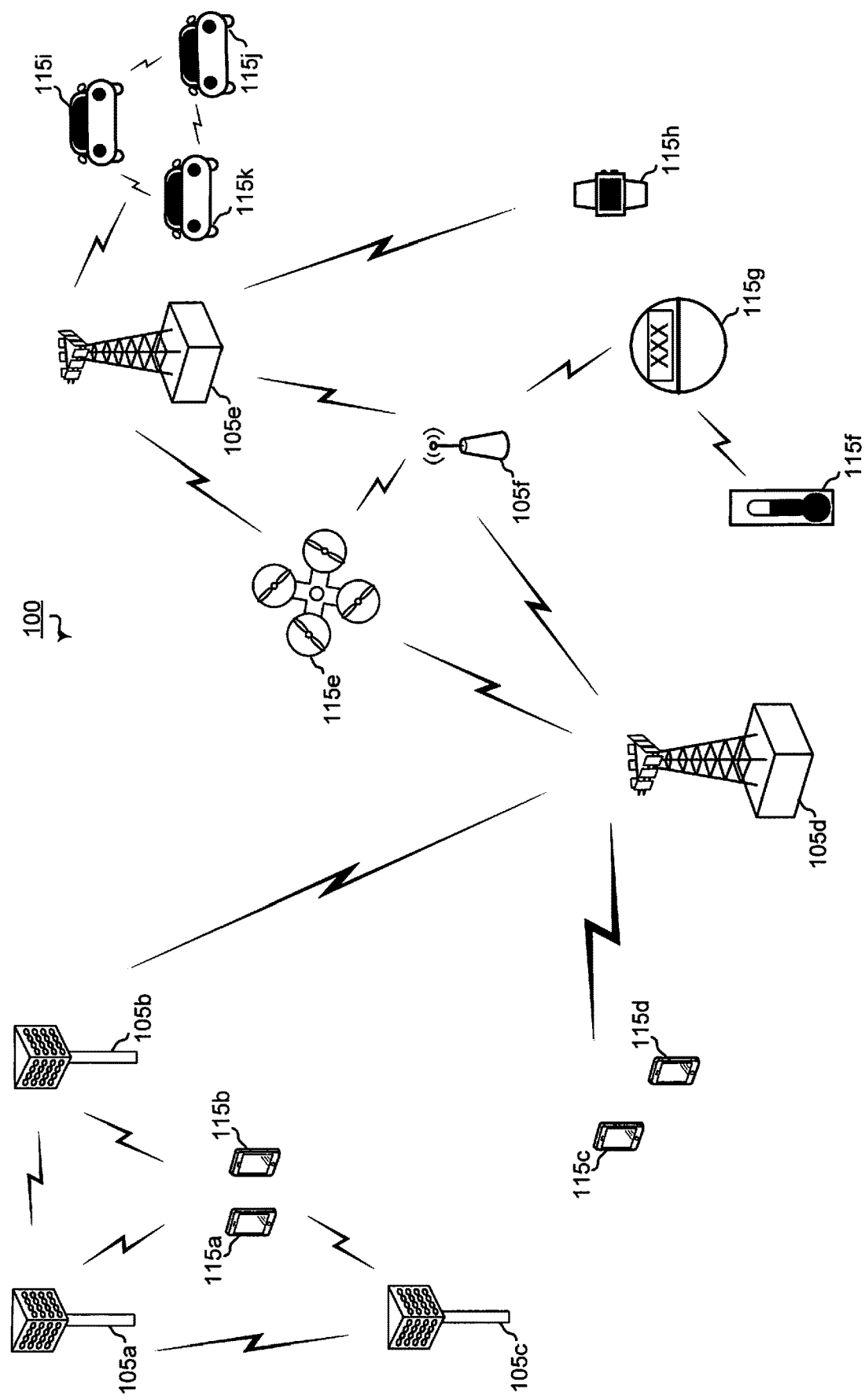
FIG. 1 is a block diagram illustrating details of a wireless communication system.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating 5G network 100 including various base stations and UEs configured according to aspects of the present disclosure. The 5G network 100 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, the base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

The 5G network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE may be a device that includes a Universal Integrated Circuit Card (UICC). In another aspect, a UE may be a device that does not include a UICC. In some aspects, UEs that do not include UICCs may also be referred to as interne of everything (IoE) devices. UEs 115a-115d are examples of mobile smart phone-type devices accessing 5G network 100 A UE may also be a machine specifically configured for connected communication, including machine type communication (MTC), enhanced MTC (eMTC), narrowband IoT (NB-IoT) and the like. UEs 115e-115k are examples of various machines configured for communication that access 5G network 100. A UE may be able to communicate with any type of the base stations, whether macro base station, small cell, or the like. In FIG. 1, a lightning bolt (e.g., communication links) indicates wireless transmissions between a UE and a serving base station, which is a base station designated to serve the UE on the downlink and/or uplink, or desired transmission between base stations, and backhaul transmissions between base stations.

In operation at 5G network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

5G network 100 also support mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through 5G network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. 5G network 100 may also provide additional network efficiency through dynamic, low-latency TDD/FDD communications, such as in a vehicle-to-vehicle (V2V) mesh network between UEs 115i-115k communicating with macro base station 105e.

Figure 2:
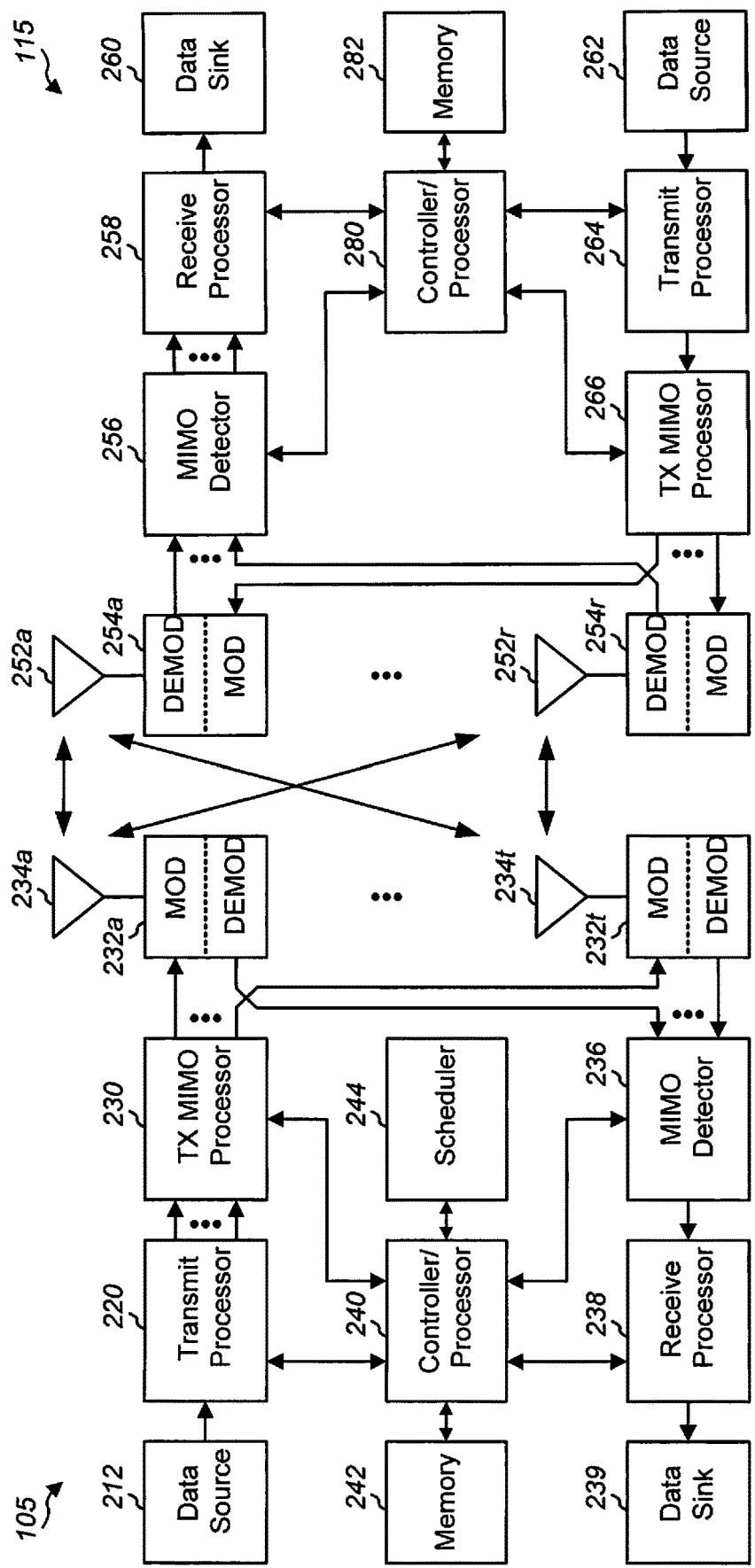
FIG. 2 is a block diagram illustrating a design of a base station and a UE configured according to one aspect of the present disclosure.

FIG. 2 shows a block diagram of a design of a base station 105 and a UE 115, which may be one of the base station and one of the UEs in FIG. 1. At the base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processes for the techniques described herein. The controllers/processor 280 and/or other processors and modules at the UE 115 may also perform or direct the execution of the functional blocks illustrated in FIGS. 4A and 4B, and/or other processes for the techniques described herein. The memories 242 and 282 may store data and program codes for the base station 105 and the UE 115, respectively. A scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Use of a medium-sensing procedure to contend for access to an unlicensed shared spectrum may result in communication inefficiencies. This may be particularly evident when multiple network operating entities (e.g., network operators) are attempting to access a shared resource. In 5G network 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

Figure 3:
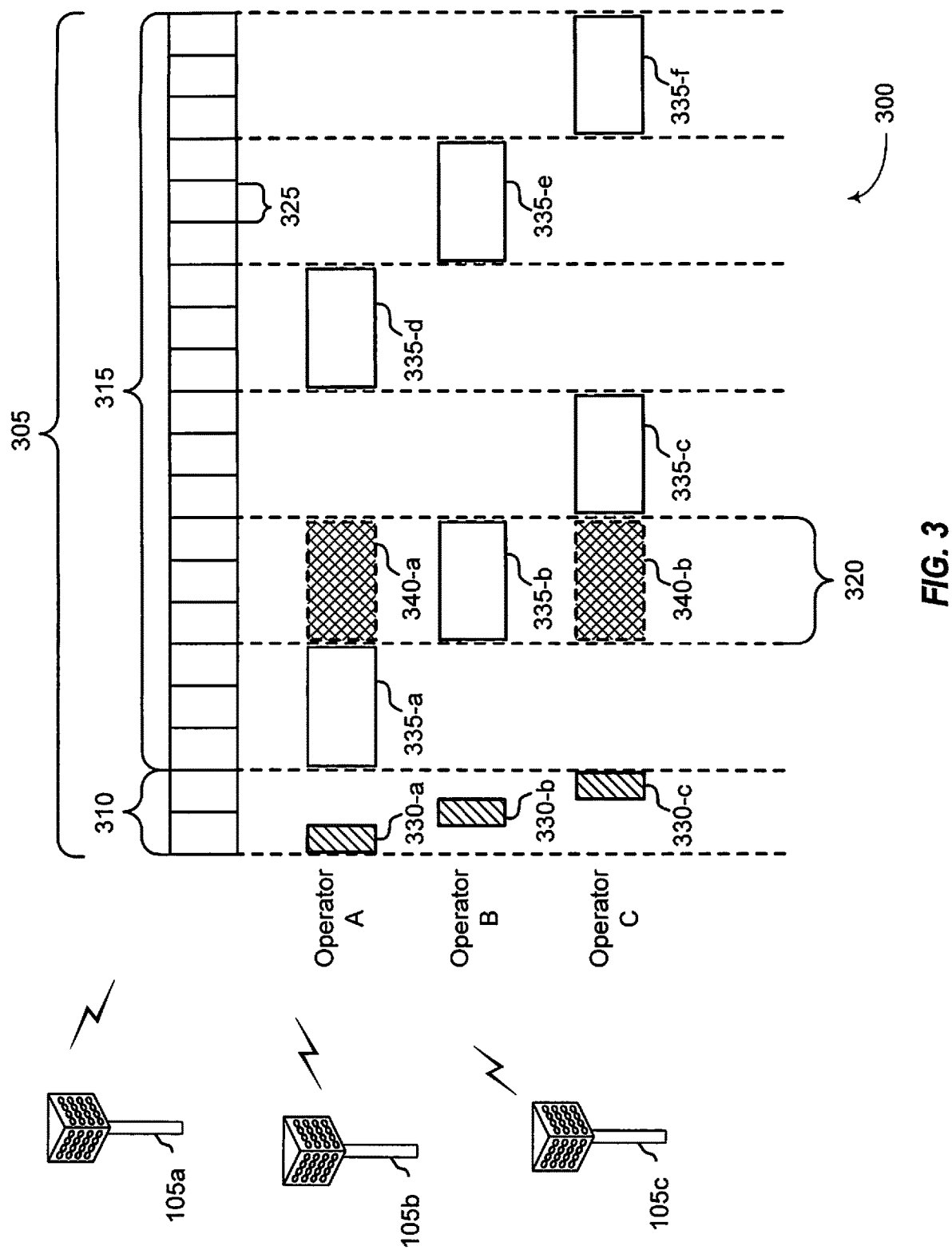
FIG. 3 illustrates an example of a timing diagram for coordinated resource partitioning.

FIG. 3 illustrates an example of a timing diagram 300 for coordinated resource partitioning. The timing diagram 300 includes a superframe 305, which may represent a fixed duration of time (e.g., 20 ms). Superframe 305 may be repeated for a given communication session and may be used by a wireless system such as 5G network 100 described with reference to FIG. 1. The superframe 305 may be divided into intervals such as an acquisition interval (A-INT) 310 and an arbitration interval 315. As described in more detail below, the A-INT 310 and arbitration interval 315 may be subdivided into sub-intervals, designated for certain resource types, and allocated to different network operating entities to facilitate coordinated communications between the different network operating entities. For example, the arbitration interval 315 may be divided into a plurality of sub-intervals 320. Also, the superframe 305 may be further divided into a plurality of subframes 325 with a fixed duration (e.g., 1 ms). While timing diagram 300 illustrates three different network operating entities (e.g., Operator A, Operator B, Operator C), the number of network operating entities using the superframe 305 for coordinated communications may be greater than or fewer than the number illustrated in timing diagram 300.

The A-INT 310 may be a dedicated interval of the superframe 305 that is reserved for exclusive communications by the network operating entities. In some examples, each network operating entity may be allocated certain resources within the A-INT 310 for exclusive communications. For example, resources 330-*a* may be reserved for exclusive communications by Operator A, such as through base station 105*a*, resources 330-*b* may be reserved for exclusive communications by Operator B, such as through base station 105*b*, and resources 330-*c* may be reserved for exclusive communications by Operator C, such as through base station 105*c*. Since the resources 330-*a* are reserved for exclusive communications by Operator A, neither Operator B nor Operator C can communicate during resources 330-*a*, even if Operator A chooses not to communicate during those resources. That is, access to exclusive resources is limited to the designated network operator. Similar restrictions apply to resources 330-*b* for Operator B and resources 330-*c* for Operator C. The wireless nodes of Operator A (e.g, UEs 115 or base stations 105) may communicate any information desired during their exclusive resources 330-*a*, such as control information or data.

When communicating over an exclusive resource, a network operating entity does not need to perform any medium sensing procedures (e.g., listen-before-talk (LBT) or clear channel assessment (CCA)) because the network operating entity knows that the resources are reserved. Because only the designated network operating entity may communicate over exclusive resources, there may be a reduced likelihood of interfering communications as compared to relying on medium sensing techniques alone (e.g., no hidden node problem). In some examples, the A-INT 310 is used to transmit control information, such as synchronization signals (e.g., SYNC signals), system information (e.g., system information blocks (SIBs)), paging information (e.g., physical broadcast channel (PBCH) messages), or random access information (e.g., random access channel (RACH) signals). In some examples, all of the wireless nodes associated with a network operating entity may transmit at the same time during their exclusive resources.

In some examples, resources may be classified as prioritized for certain network operating entities. Resources that are assigned with priority for a certain network operating entity may be referred to as a guaranteed interval (G-INT) for that network operating entity. The interval of resources used by the network operating entity during the G-INT may be referred to as a prioritized sub-interval. For example, resources 335-*a* may be prioritized for use by Operator A and may therefore be referred to as a G-INT for Operator A (e.g., G-INT-OpA). Similarly, resources 335-*b* may be prioritized for Operator B, resources 335-*c* may be prioritized for Operator C, resources 335-*d* may be prioritized for Operator A, resources 335-*e* may be prioritized for Operator B, and resources 335-*f* may be prioritized for operator C.

The various G-INT resources illustrated in FIG. 3 appear to be staggered to illustrate their association with their respective network operating entities, but these resources may all be on the same frequency bandwidth. Thus, if viewed along a time-frequency grid, the G-INT resources may appear as a contiguous line within the superframe 305. This partitioning of data may be an example of time division multiplexing (TDM). Also, when resources appear in the same sub-interval (e.g., resources 340-*a* and resources 335-*b*), these resources represent the same time resources with respect to the superframe 305 (e.g., the resources occupy the same sub-interval 320), but the resources are separately designated to illustrate that the same time resources can be classified differently for different operators.

When resources are assigned with priority for a certain network operating entity (e.g., a G-INT), that network operating entity may communicate using those resources without having to wait or perform any medium sensing procedures (e.g., LBT or CCA). For example, the wireless nodes of Operator A are free to communicate any data or control information during resources 335-*a* without interference from the wireless nodes of Operator B or Operator C.

A network operating entity may additionally signal to another operator that it intends to use a particular G-INT. For example, referring to resources 335-*a*, Operator A may signal to Operator B and Operator C that it intends to use resources 335-*a*. Such signaling may be referred to as an activity indication. Moreover, since Operator A has priority over resources 335-*a*, Operator A may be considered as a higher priority operator than both Operator B and Operator C. However, as discussed above, Operator A does not have to send signaling to the other network operating entities to ensure interference-free transmission during resources 335-*a* because the resources 335-*a* are assigned with priority to Operator A.

Similarly, a network operating entity may signal to another network operating entity that it intends not to use a particular G-INT. This signaling may also be referred to as an activity indication. For example, referring to resources 335-*b*, Operator B may signal to Operator A and Operator C that it intends not to use the resources 335-*b* for communication, even though the resources are assigned with priority to Operator B. With reference to resources 335-*b*, Operator B may be considered a higher priority network operating entity than Operator A and Operator C. In such cases, Operators A and C may attempt to use resources of sub-interval 320 on an opportunistic basis. Thus, from the perspective of Operator A, the sub-interval 320 that contains resources 335-*b* may be considered an opportunistic interval (O-INT) for Operator A (e.g., O-INT-OpA). For illustrative purposes, resources 340-*a* may represent the O-INT for Operator A. Also, from the perspective of Operator C, the same sub-interval 320 may represent an O-INT for Operator C with corresponding resources 340-*b*. Resources 340-*a*, 335-*b*, and 340-*b* all represent the same time resources (e.g., a particular sub-interval 320), but are identified separately to signify that the same resources may be considered as a G-INT for some network operating entities and yet as an O-INT for others.

To utilize resources on an opportunistic basis, Operator A and Operator C may perform medium-sensing procedures to check for communications on a particular channel before transmitting data. For example, if Operator B decides not to use resources 335-*b* (e.g., G-INT-OpB), then Operator A may use those same resources (e.g., represented by resources 340-*a*) by first checking the channel for interference (e.g., LBT) and then transmitting data if the channel was determined to be clear. Similarly, if Operator C wanted to access resources on an opportunistic basis during sub-interval 320 (e.g., use an O-INT represented by resources 340-*b*) in response to an indication that Operator B was not going to use its G-INT, Operator C may perform a medium sensing procedure and access the resources if available. In some cases, two operators (e.g., Operator A and Operator C) may attempt to access the same resources, in which case the operators may employ contention-based procedures to avoid interfering communications. The operators may also have sub-priorities assigned to them designed to determine which operator may gain access to resources if more than operator is attempting access simultaneously.

In some examples, a network operating entity may intend not to use a particular G-INT assigned to it, but may not send out an activity indication that conveys the intent not to use the resources. In such cases, for a particular sub-interval 320, lower priority operating entities may be configured to monitor the channel to determine whether a higher priority operating entity is using the resources. If a lower priority operating entity determines through LBT or similar method that a higher priority operating entity is not going to use its G-INT resources, then the lower priority operating entities may attempt to access the resources on an opportunistic basis as described above.

In some examples, access to a G-INT or O-INT may be preceded by a reservation signal (e.g., request-to-send (RTS)/clear-to-send (CTS)), and the contention window (CW) may be randomly chosen between one and the total number of operating entities.

In some examples, an operating entity may employ or be compatible with coordinated multipoint (CoMP) communications. For example an operating entity may employ CoMP and dynamic time division duplex (TDD) in a G-INT and opportunistic CoMP in an O-INT as needed.

In the example illustrated in FIG. 3, each sub-interval 320 includes a G-INT for one of Operator A, B, or C. However, in some cases, one or more sub-intervals 320 may include resources that are neither reserved for exclusive use nor reserved for prioritized use (e.g., unassigned resources). Such unassigned resources may be considered an O-INT for any network operating entity, and may be accessed on an opportunistic basis as described above.

In some examples, each subframe 325 may contain 14 symbols (e.g., 250-µs for 60 kHz tone spacing). These subframes 325 may be standalone, self-contained Interval-Cs (ITCs) or the subframes 325 may be a part of a long ITC. An ITC may be a self-contained transmission starting with a downlink transmission and ending with a uplink transmission. In some embodiments, an ITC may contain one or more subframes 325 operating contiguously upon medium occupation. In some cases, there may be a maximum of eight network operators in an A-INT 310 (e.g., with duration of 2 ms) assuming a 250-µs transmission opportunity.

Although three operators are illustrated in FIG. 3, it should be understood that fewer or more network operating entities may be configured to operate in a coordinated manner as described above. In some cases, the location of the G-INT, O-INT, or A-INT within superframe 305 for each operator is determined autonomously based on the number of network operating entities active in a system. For example, if there is only one network operating entity, each sub-interval 320 may be occupied by a G-INT for that single network operating entity, or the sub-intervals 320 may alternate between G-INTs for that network operating entity and O-INTs to allow other network operating entities to enter. If there are two network operating entities, the sub-intervals 320 may alternate between G-INTs for the first network operating entity and G-INTs for the second network operating entity. If there are three network operating entities, the G-INT and O-INTs for each network operating entity may be designed as illustrated in FIG. 3. If there are four network operating entities, the first four sub-intervals 320 may include consecutive G-INTs for the four network operating entities and the remaining two sub-intervals 320 may contain O-INTs. Similarly, if there are five network operating entities, the first five sub-intervals 320 may contain consecutive G-INTs for the five network operating entities and the remaining sub-interval 320 may contain an O-INT. If there are six network operating entities, all six sub-intervals 320 may include consecutive G-INTs for each network operating entity. It should be understood that these examples are for illustrative purposes only and that other autonomously determined interval allocations may be used.

It should be understood that the coordination framework described with reference to FIG. 3 is for illustration purposes only. For example, the duration of superframe 305 may be more or less than 20 ms. Also, the number, duration, and location of sub-intervals 320 and subframes 325 may differ from the configuration illustrated. Also, the types of resource designations (e.g., exclusive, prioritized, unassigned) may differ or include more or less sub-designations.

In legacy shared spectrum networks, a contention mechanism has been used that provides for handshake-like signals between the intended transmitter and the intended receiver. These signals are monitored by surrounding network nodes which, if detected, are used to determine whether to back-off potentially interfering transmissions. One such contention mechanism includes request-to-send (RTS)/clear-to-send (CTS) signaling. RTS/CTS or similar mechanism have been widely used to protect the reception from potential interferers. RTS is signaled by the transmitter to announce its intent to transmit, while CTS is signaled by the receiver to announce its intent to reserve the medium for reception. In systems utilizing channel reciprocity, sounding reference signals (SRS) transmitted from UEs may serve as an RTS/CTS signal, depending on whether the UE is the transmitter or receiver in the communication pair. However, neighboring nodes blindly assuming that all SRS transmissions imply an RTS/CTS signal results in inefficient operation. Because detection of RTS/CTS may result in the neighboring node backing-off of intended transmissions, the assumption that all SRS are RTS/CTS could result in the neighbor node delaying transmissions when a legacy SRS has been transmitted. The legacy SRS does not specifically indicate that a transmission is forthcoming. Various aspects of the present disclosure are directed to providing a distinguishable SRS type that may indicate whether the detected SRS is an RTS/CTS signal, which may affect transmission decisions of the neighboring node, or a legacy SRS, which would have no effect on neighbor transmission decisions. Such an aspect may be applicable and relevant to both shared and unshared spectrum in both licensed and unlicensed deployments.

In a downlink scenario, the CTS transmission from UEs attempt to protect the reception of the downlink signal from interference, wherein the SRS from the UEs would function as the CTS. SRS have the dual purpose of channel sounding and CTS. In downlink, the SRS request (e.g., PDCCH) serves as the corresponding RTS. For example, for reciprocity based downlink coordinated multipoint (CoMP) and downlink multi-user multiple input, multiple output (MU-MIMO) operations, other gNBs or transmission and reception points (TRPs) detecting SRS can avoid the spatial direction from which the SRS was received in order to avoid causing interference to the UE transmitting the detected SRS. However, as noted above blindly assuming that SRS implies CTS may unnecessarily silence the neighbors, if the gNB requesting SRS is only interested in channel sounding without (immediate) intention to schedule the UE.

Various aspects of the present disclosure may define at least two types of SRSs. A first type (e.g., Type A) may define a legacy SRS without the role of CTS. Thus, neighboring gNBs/TRPs that detect such Type A SRS would not be prompted to back-off transmissions or transmit by creating a spatial null at the direction of the detected SRS. A second type (e.g., Type B) may define a contention SRS that takes on the role of CTS. Neighboring gNB/TRPs that detect such Type B or contention SRS would perform some additional logic or determination whether to back-off transmissions or beamform transmissions in such a manner to create a spatial null at the direction of the detected SRS.

In 5G NR networks, each UE may be configured with multiple SRS resources. Accordingly, in order to implement the various aspects of the present disclosure, the type of SRS may be assigned to a specific SRS resource. Such an association may occur implicitly, such as through providing specific rules in the wireless standards or specifications, or may occur explicitly via backhaul coordination between gNBs/TRPs exchanging rules associating the particular SRS resources available to a particular SRS type. Thus, neighboring gNBs/TRPs, upon detecting SRS from non-served UEs, would be able to know which type of SRS has been detected based on the SRS resource used for the SRS transmission. The UE would be configured with multiple SRS resources, each of which is associated with the particular type (e.g., legacy or contention) of SRS. The SRS type-resource association may be negotiated between neighboring base stations and may also be transmitted to the served UEs.

Figure 7:
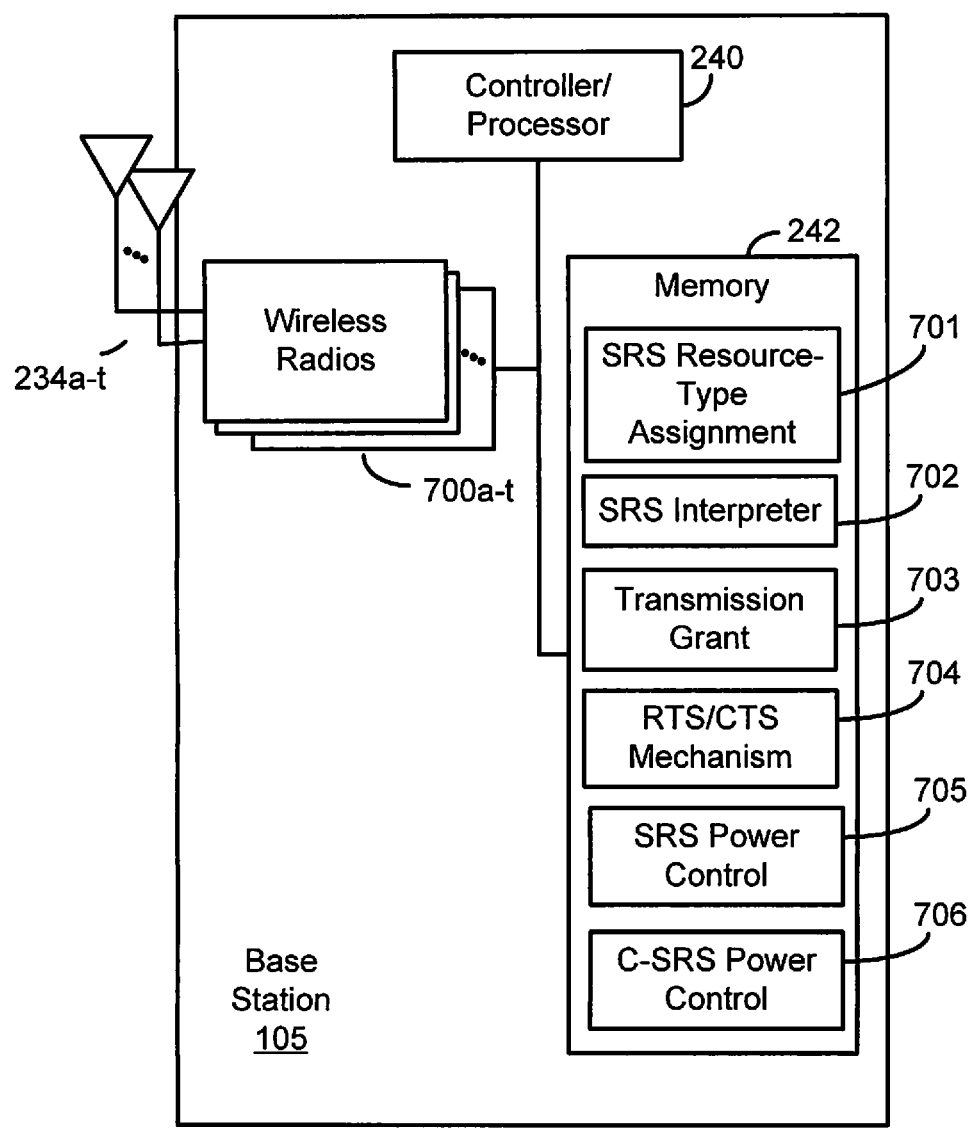
FIG. 7 is a block diagram illustrating an example gNB configured according to aspects of the present disclosure.

FIG. 4A is a block diagram illustrating example blocks executed to implement one aspect of the present disclosure. The example blocks will also be described with respect to base station 105 as illustrated in FIG. 7. FIG. 7 is a block diagram illustrating base station 105 configured according to one aspect of the present disclosure. Base station 105 includes the structure, hardware, and components as illustrated for base station 105 of FIG. 2. For example, base station 105 includes controller/processor 240, which operates to execute logic or computer instructions stored in memory 242, as well as controlling the components of base station 105 that provide the features and functionality of base station 105. Base station 105, under control of controller/processor 240, transmits and receives signals via wireless radios 700a-t and antennas 234a-t. Wireless radios 700a-t includes various components and hardware, as illustrated in FIG. 2 for base station 105, including modulator/demodulators 232a-t, MIMO detector 236, receive processor 238, transmit processor 220, and TX MIMO processor 230.

At block 400, a serving base station selects an SRS type to request from a served UE, wherein the SRS type is either a legacy SRS or a contention SRS. As a serving base station, base station 105, for example, determines whether data is available for communication with the served UE, either data at the base station for downlink transmission, or data at the UE for uplink transmission. By execution of RTS/CTS mechanism 704, SRS resource-type assignment 701, and transmission grant 703, stored in memory 242, base station 105, under control of controller/processor 240, would determine whether uplink or downlink data is to be scheduled with an uplink or downlink transmission grant and selects the SRS type accordingly. For data transmission, serving base station 105 would select an SRS type corresponding to the contention SRS type. When no data is scheduled for communication with the UE, the serving base station would select the SRS type corresponding to the legacy SRS type.

At block 401, the serving base station determines an SRS resource for use by the served UE for SRS transmission, wherein the SRS resource is determined based on the served UE and the selected SRS type. Multiple SRS resources may be available within the communication area. Each UE within such area may be configured for multiple SRS resources. In order to identify whether the SRS requested should be a legacy SRS or a contention SRS, each SRS type (e.g., legacy SRS or contention SRS) are associated with a particular SRS resource. This resource-type association is stored or generated at base station 105 via SRS resource-type assignment 701. Accordingly, depending on the selected SRS type, serving base station 105 will determine the corresponding SRS resource for the selected SRS type using SRS resource-type assignment 701.

At block 402, the serving base station transmits an SRS request to the served UE, wherein the SRS request includes information identifying the determined SRS resource. Under control of controller/processor 240, serving base station 105 transmits the SRS request by executing RTS/CTS mechanism 704, stored in memory 240, and transmitting the request via wireless radios 700a-t and antennas 234a-t. The execution environment of RTS/CTS mechanism 704 and SRS resource-type assignment 701 causes base station 105 to include an identifier or additional information that identifies to the served UE what the SRS resources are for the requested SRS transmission.

At block 403, the serving base station receives an SRS on the determined SRS resource from the served UE. After transmitting the SRS request for the particular SRS type along with the specific SRS resource to the UE, serving base station 105 will detect and receive an SRS on the specified SRS resource via antennas 234a-t and wireless radios 700a-t. By arriving on the specified SRS resource, serving base station 105 will know that the received SRS is of the type requested.

Figure 8:
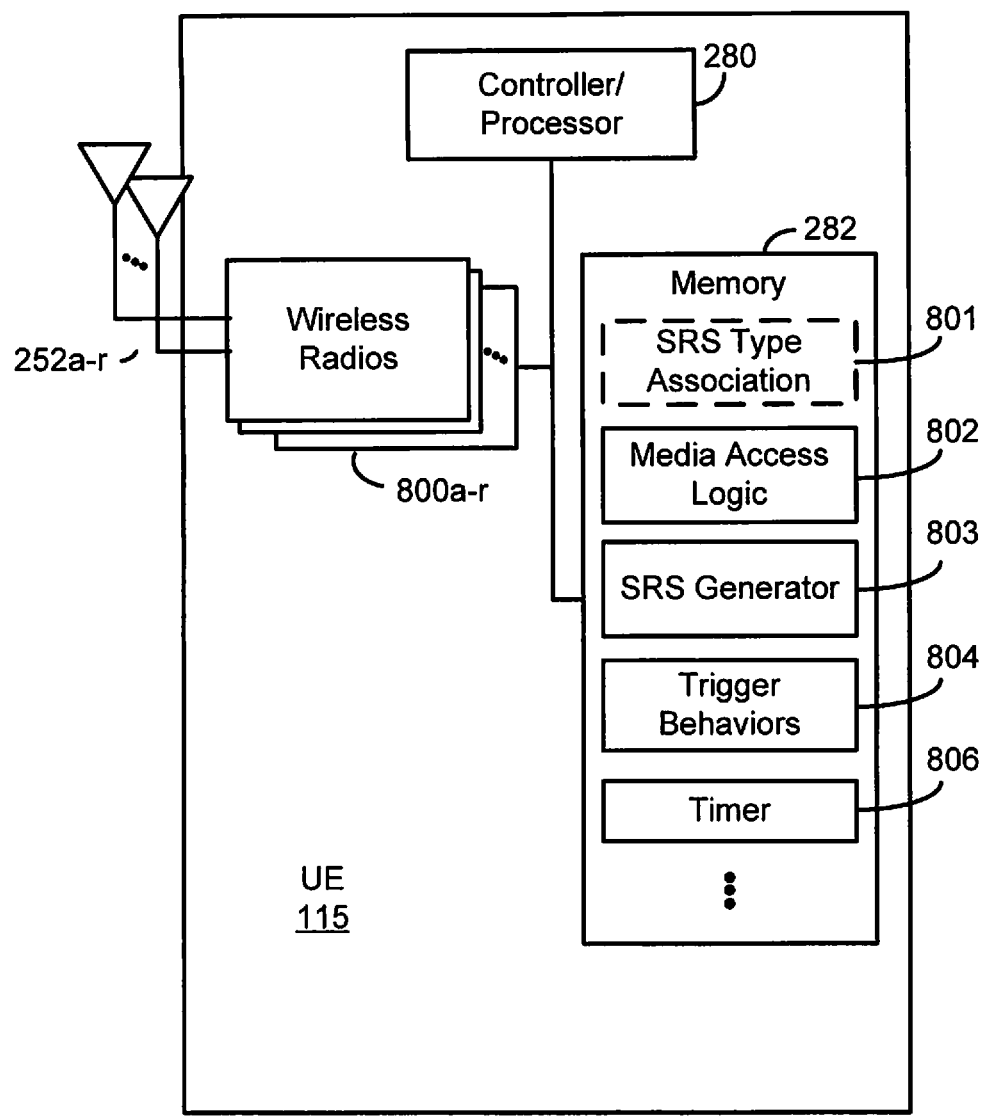
FIG. 8 is a block diagram illustrating an example UE configured according to aspects of the present disclosure.

FIG. 4B is a block diagram illustrating example blocks executed to implement one aspect of the present disclosure. The example blocks of FIG. 4B will also be described with respect to UE 115 as illustrated in FIG. 8. FIG. 8 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 800a-r and antennas 252a-r. Wireless radios 800a-r includes various components and hardware as illustrated in FIG. 2 for UE 115, including demodulator/modulators 254a-r, MIMO detector 256, receive processor 258, transmit processor 264, and TX MIMO processor 266.

On the UE side of the communication, at block 404, the UE receives an SRS resource-type association identifying an SRS type associated with a corresponding SRS resource, wherein the SRS type includes either a legacy SRS or a contention SRS. For example, UE 115 receives via antennas 252a-r and wireless radios 800a-r a signal that identifies the SRS resource-type association and stores that information at SRS type association 801, in memory 282. The information identifies the type of SRS that is associated with the SRS resources configured for UE 115.

At block 405, the UE receives the SRS request from the serving base station, wherein the SRS request contains information identifying an SRS resource for SRS transmission. The UE, such as UE 115, will prepare for sending the SRS by using the SRS resource identified in the SRS request and determining the type of SRS by accessing the type information at SRS type association 801. UE 115 receives the SRS request over antennas 252a-r and wireless radios 800a-r. Under control of controller/processor 280, UE 115 executes media access logic which allows UE 115 to read the SRS request and determine the SRS resource identified for transmission.

At block 406, the UE transmits an SRS on the SRS resource identified in the SRS request. The type of SRS transmitted by UE 115 will depend on the SRS request received at block 405. The SRS request may request a legacy SRS or a contention SRS. For a contention SRS, depending on the direction of communication (e.g., downlink or uplink), the SRS transmitted by UE 115 may either operate as an RTS, for an uplink transmission, or a CTS, for a downlink transmission. Under control of controller/processor 280, UE 115 executes SRS generator logic 803 stored in memory 282 to generate the specific type of SRS requested (e.g., legacy SRS, contention SRS, uplink contention SRS, downlink contention SRS, etc.). UE 115 would then transmit the generated SRS via wireless radios 800a-r and antennas 252a-r. According to aspects of the present disclosure, the SRS will be transmitted on the particular SRS resource identified to UE 115 in the SRS request. The SRS resource will signify to UE 115 whether it is to send a contention SRS or a legacy SRS.

UE 115 communicates with serving base station 105, wherein the communicating includes either transmitting uplink signals or receiving downlink signals. If contention SRS are transmitted by UE 115, communication with the serving base station may occur either with UE 115 transmitting uplink signals or receiving downlink signals. The request and transmission of the contention SRS operates to inform neighboring nodes when to expect and how to deal with interference from or causing interference to the communication pair of UE 115 and serving base station 105.

Figure 4C:
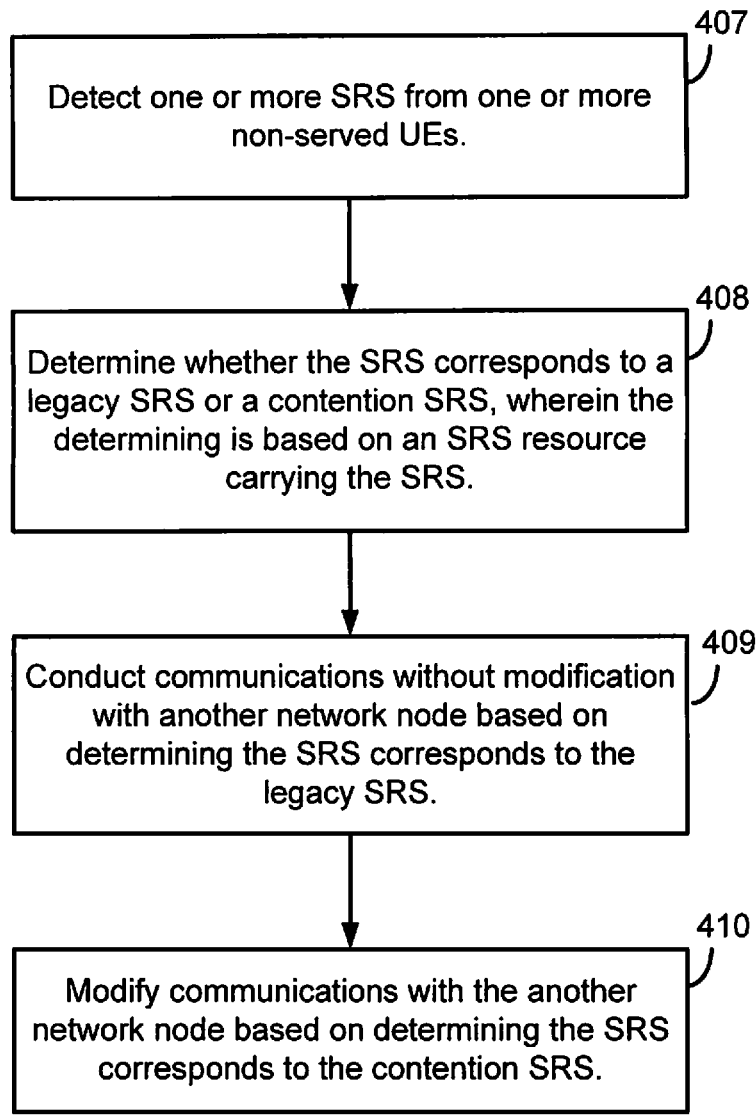

FIG. 4C is a block diagram illustrating example blocks executed to implement one aspect of the present disclosure. The example blocks will also be described with respect to base station 105 and UE 115, as illustrated in FIGS. 7 and 8, respectively. For purposes of the example illustrated in FIG. 4C, as described, base station 105 and UE 115 are neighbor nodes to another communication pair.

At block 407, a network node detects one or more SRS from one or more non-served UEs. The network node may be either a neighboring gNB/TRP, such as base station 105, or a neighboring UE, such as UE 115, either from the same operator as the communication pair transmitting RTS/CTS or a different operator. The network node operates using the same medium as the communication pair in either licensed or unlicensed spectrum. The network node monitors for signals from neighboring nodes, such as CTS or contention SRS over the medium. For example, base station 105 may receive the SRS signals over antennas 234a-t and wireless radios 700a-t. Using SRS interpreter 702, stored in memory 242, base station 105 detects the SRS from a non-served UE. Similarly, UE 115 receives the SRS via antennas 252a-r and wireless radios 800a-r. Through execution of media access logic 802, UE 115 is able to determine and detect the SRS from the neighboring UE.

At block 408, the network node determines whether the SRS corresponds to a legacy SRS associated with channel measurement sounding or a contention SRS associated with contention resolution medium sharing. When an SRS signal is detected, the network node determines whether or not the SRS is a legacy SRS or a contention SRS. The network node determines the type of SRS by looking at the SRS resource that carried the SRS. For example, base station 105 may execute SRS resource-type association 701 to determine which SRS type has been detected based on the SRS resource the signal was received on. Similarly, UE 115 accesses SRS type association 801, stored in memory 282, to determine whether the detected SRS signal is a legacy type or contention type based on the SRS resource. If the SRS resource is associated with legacy-type SRS, then the network node would determine the detected SRS is a legacy SRS. Otherwise, if the SRS resource is associated with a contention-type SRS, then the network node would determine the detected SRS is a contention SRS.

At block 409, the network node conducts communication without modification with another network node based on determining the SRS corresponds to the legacy SRS. Because a legacy SRS is associated with channel measurement sounding and not necessarily for immediate transmission, the network node may conduct its communications without modification, whether uplink or downlink communications and whether the network node is a UE communicating with a gNB or a gNB communicating with a UE. Thus, if either or both of base station 105 and UE 115 determine that the detected SRS is a legacy SRS, they may conduct communications as normal.

At block 410, the network node modifies communications with the another network node based on determining the SRS corresponds to the contention SRS. When the network node detects a contention SRS, then it may modify its normal communications with its communication pair network node. Thus, base station 105 and UE 115, upon detecting that the SRS received is a contention SRS, they may take an action to modify their normal communications in response. The modifications may take various forms. For example, the network node may determine to back-off of transmissions completely for a predetermined time. The network node may also determine the spatial direction of the detected contention SRS and modify its communications by communicating only with other network nodes in directions other than the direction of the SRS. Using beamforming, the network node may also beamform transmissions to create a spatial null in the direction of the contention SRS.

It should be noted that, in certain aspects, the UE would not necessarily need to know the SRS resource-type association. Such a UE would simply instructed in the downlink control information (DCI) to transmit SRS in a specific SRS resource. The instructing gNB/TRP would specifically assign the SRS resource associated with either the legacy SRS or RTS/CTS SRS. In such as aspect, UE 115 would not include SRS type association 801 in memory 282. Alternatively, other aspects may provide more detailed instruction to the UE which identifies the specific SRS resource-type association. In such other aspects, SRS type association 801 would include such identified details specifying the SRS resource-type associations.

Figure 5:
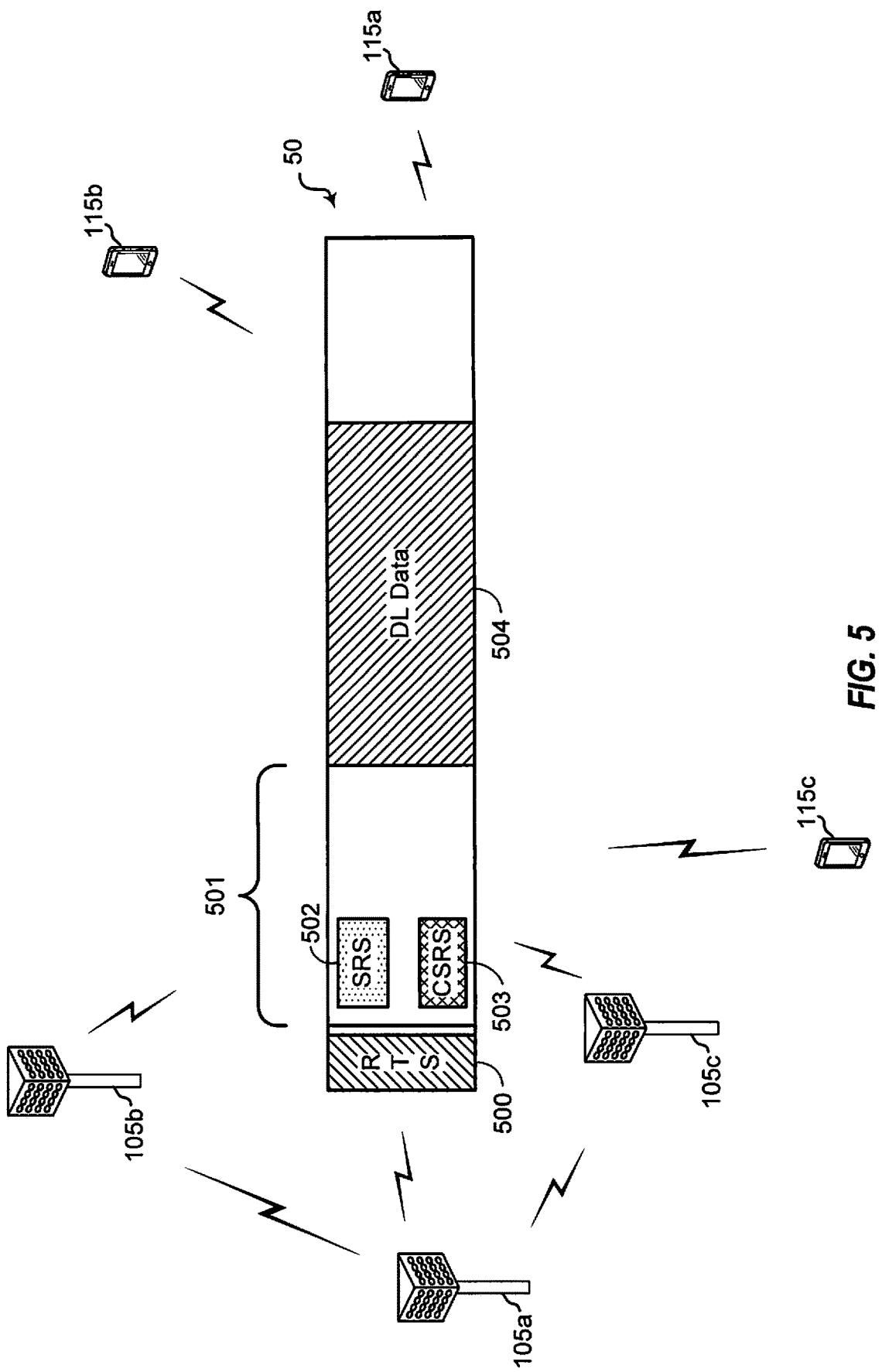
FIG. 5 is a block diagram illustrating gNBs and UEs configured according to one aspect of the present disclosure.

FIG. 5 is a block diagram illustrating gNBs 105*a*-105*c* and UEs 115*a*-115*c* configured according to one aspect of the present disclosure. As illustrated, gNB 105*a* and UE 115*a* are in communication over a shared spectrum 50 with gNBs 105*b*-105*c* and UEs 115*b*-115*c*, respectively. The example of FIG. 5 illustrates a downlink direction communication between gNB 105*a* and UE 115*a*. When gNB 105*a* has data for downlink transmission to UE 115*a*, it transmits RTS 500 over shared spectrum 50. RTS 500 may take the form of a downlink grant or PDCCH. Block 501 includes the contention area where SRS resources are assigned for the UEs sharing shared spectrum 50. UE 115*a* has been assigned two different SRS resources, one for legacy SRS and the other for contention SRS. UE 115*a* transmits contention SRS 503 using the associated SRS resource. In response to contention SRS 503, gNB 105*a* begins transmitting downlink data 504 over shared spectrum 50.

Neighbor nodes, such as gNB 105*b*-105*c* and UEs 115*b*-115*c*, monitor shared spectrum 50. The neighbor nodes detect contention SRS 503. The neighbor nodes are aware of which resources to look for in order to detect contention SRS 503. For example, gNBs 105*b*-105*c* are in a downlink scenario with UEs 115*b*-115*c*, respectively. Thus, gNB 105*b* detects and determines that contention SRS 503 is a contention SRS and observes that contention SRS 503 was detected above a pre-defined energy threshold. As such, gNB 105*b* determines to back-off the downlink transmission for a predetermine amount of time. gNB 105*c* observes that contention SRS 503 was either not detected or detected below a pre-define energy threshold. Accordingly, gNB 105*c* determines to initiate downlink transmissions to UE 115*c*. In another flavor, if the channel sensing rule allows directional sensing, gNB 105*c* may detect contention SRS 503 above a pre-defined energy threshold but determine that the spatial direction of contention SRS 503 is different from the spatial direction of UE 115*c*. Accordingly, gNB 105*c* determines to initiate downlink transmissions to UE 115*c*, while employing beamforming, such that the beam creates a null in the direction of UE 105*a*, where contention SRS 503 was detected from.

It should be noted that the association of SRS resources to the particular type of SRS (e.g., legacy SRS, contention SRS, contention-DL SRS, contention-UL SRS, etc.) may be implicitly known, for example by being part of the wireless standards or specifications, which would be known by the gNBs/TRPs. They SRS resource-type association may also be coordinated over backhaul communications between the neighboring nodes, such as gNBs 105*a*-105*c* (FIG. 5).

Figure 6:
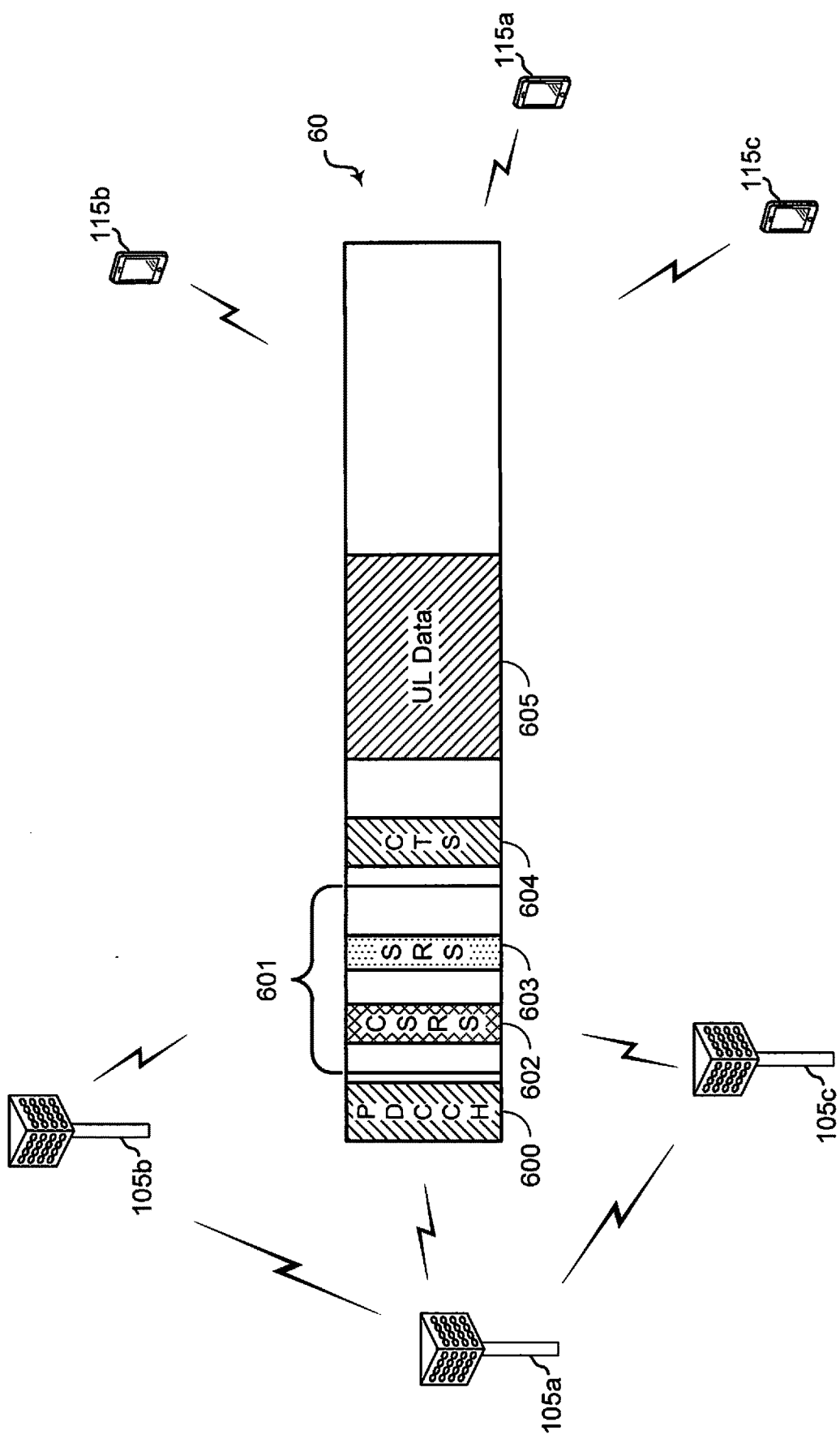
FIG. 6 is a block diagram illustrating gNBs and UEs configured according to one aspect of the present disclosure.

FIG. 6 is a block diagram illustrating gNBs 105*a*-105*c* and UEs 115*a*-115*c* configured according to one aspect of the present disclosure. As illustrated, gNB 105*a* and UE 115*a* are in communication over a shared medium 50 with gNBs 105*b*-105*c* and UEs 115*b*-115*c*, respectively. The example of FIG. 6 illustrates an uplink direction communication between UE 115*a* and gNB 105*a*. In the uplink direction, the contention SRS would function as RTS. Therefore, according to aspects of the present disclosure, the Type A or legacy SRS without the role of RTS would be requested by the gNB when the gNB does not intend to immediately schedule PUSCH from the served UE. The Type B or contention SRS with the role of RTS would be requested by the gNB when the gNB wants to schedule PUSCH immediately from the served UE. Neighboring gNBs/TRPs detecting and measuring this SRS would know, based on the SRS resource and assigned type, what interference may be coming and use that information for interference avoidance or scheduling.

Referring back to FIG. 6, when UE 115*a* receives data for uplink transmission, it makes a scheduling request to gNB 105*a* (not shown). In response to the scheduling request, gNB 105*a* transmits an uplink grant in PDCCH 600 over shared spectrum 60, along with the SRS request asking the UE to transmit SRS on a SRS resource 602. SRS resource 602 corresponds to that of contention SRS. UE 115*a* transmits contention SRS 602 using the assigned SRS resources for contention-type SRS within contention region 601. In the uplink scenario of FIG. 6, contention SRS 602 corresponds to the RTS transmission. Optionally, gNB 105*a* responds to contention SRS 602 by transmitting CTS 604. UE 115*a* would then begin transmitting its uplink data 605 over shared spectrum 60.

Neighbor nodes, such as gNB 105*b*-105*c* and UEs 115*b*-115*c*, monitor shared spectrum 60. The neighbor nodes detect contention SRS 602. The neighbor nodes are aware of which resources to look for in order to detect contention SRS 602. As illustrated in FIG. 6, contention SRS 602 and legacy SRS 603 are transmitted in different symbols, as opposed to the transmission of legacy SRS 502 and contention SRS 503, which are transmitted in the same symbol in a frequency division multiplexed manner. Aspects of the present disclosure are not limited to any particular manner of SRS transmission. gNBs 105*b*-105*c* both determine that the contention SRS 503 is detected above a pre-defined energy threshold. Accordingly, both gNBs 105*b*-105*c* do not send uplink grants for the next transmission opportunity, but wait for a next time period. In another flavor, in case the channel sensing rule allows directional sensing, gNBs 105*b*-105*c* both determine that the spatial direction of contention SRS 602 is roughly the same as the spatial direction that uplink transmissions from UE 115*b*-115*c*, respectively. Accordingly, both gNBs 105*b*-105*c* do not send uplink grants for the next transmission opportunity, but wait for a next time period.

It should be noted that for contention SRS, the expected behavior from the neighboring nodes may be different depending on whether the SRS was intended to be used for downlink or uplink scheduling, or both. If the contention SRS is intended for downlink scheduling, such as illustrated in FIG. 5, neighboring gNBs/TRPs, gNBs 105*b*-105*c*, are still allowed to transmit as long as they do not cause significant interference toward the spatial directions where the SRS was received from, such as the spatial direction of contention SRS 503 from UE 115*a*. If the contention SRS is intended for uplink scheduling, such as illustrated in FIG. 6, neighboring gNBs/TRPs, gNBs 105*b*-105*c*, may safely receive uplink transmissions from their served UEs, UEs 115*b*-115*c*, as long as the uplink transmissions are from spatial directions away from the spatial directions where the SRS was received from. Additional aspects of the present disclosure provide for indicating in contention SRS whether the SRS is for downlink scheduling, uplink scheduling, or both. (e.g., Type-B-DL, Type-B-UL, Type-B-AL). In one example implementation of such an aspect, each direction of contention SRS could be associated with a different SRS resource, such that the neighboring nodes would be able to determine whether the contention SRS is for downlink, uplink, or bi-directional scheduling. For example, the SRS resource assigned for downlink SRS, such as contention SRS 503, is different from the SRS resource assigned for uplink SRS, such as contention SRS 602. The neighboring nodes, gNBs 105b-105c and UEs 115b-115c, would be able to distinguish which SRS resource was used to carry the uplink and downlink contention SRS and, based on that SRS resource, determine that the contention SRS was for either uplink or downlink.

In additional aspects of the present disclosure, the served UE may first determine whether the shared medium is free before transmitting the contention SRS. Thus, in response to a downlink grant (RTS), the UE would transmit a contention SRS (CTS) only when the UE senses the medium as free for reception. For example, referring to FIG. 8, the execution environment of media access logic 802 would first list to the channel when an SRS request is first received from the serving base station. Therefore, the SRS would only be triggered if the channel were free. Similarly, in response to an uplink grant, UE 115 would transmit a contention SRS (RTS) only when 115 senses the medium as free for transmission. For example, referring back to FIG. 5, prior to transmitting contention SRS 503, UE 115a listens to shared spectrum 50 to determine if any other network nodes are transmitting. UE 115a, after finding shared spectrum 50 unused, will then transmit contention SRS 503. If UE 115a would have detected transmissions on shared spectrum 50, it would have backed off transmission of contention SRS 503.

In additional aspects of the present disclosure, the network could configure the contention SRS of multiple UEs to occupy the same resource. For example, referring back to FIG. 5, in this additional aspect, both UE 115a and 115b transmit contention SRS 503 on the same SRS resource. In this aspect, the network would not be interested in using the SRS for sounding the channel. The sole purpose of this contention SRS would be for RTS/CTS signaling. Neighboring nodes, which would include all of gNBs 105a-105c and UEs 115a-115c, would detect and measure the total received energy level on the SRS resource assigned for the contention SRS 503 (which represents the combined interference from the multiple UEs) to create spatial nulls, avoid interference, and/or make the deferral decision for transmissions.

Additional aspects of the present disclosure may provide for the different types of SRS to have different power control. For example, with reference to FIG. 5, if UE 115a transmits contention SRS 503 and UE 105b transmits SRS 502, each may be transmitted according to different power control. Referring to FIG. 7, base station 105 may provide power control for legacy SRS via execution of SRS power control logic 705, stored in memory 242. The Type-A SRS is the legacy SRS, so the power control similar to that defined in LTE could be reused. However, because the contention SRS functions as RTS/CTS, it is intended to be received not only by the serving gNB, but also by the neighboring gNBs/TRPs. Therefore, the power control for contention SRS 503 may be different than legacy SRS, SRS 502. Referring again to FIG. 7, base station 105 would provide power control for contention SRS via execution of C-SRS power control 706, stored in memory 242. Because of the nature of the contention SRS, the power requirements may be different than for legacy SRS. For example, contention SRS may be transmitted at full power, at a fixed configured power, with a fixed delta offset from the legacy SRS power, or with wholly separate power control commands from the legacy SRS.

Additional aspects of the present disclosure may also provide for the different types of SRS to be transmitted according to different timing. The legacy SRS, such as SRS 502, is the traditional SRS, so it can follow the regular, legacy uplink timing. Thus, referring to FIG. 8, UE 115 may operate transmissions of legacy SRS using timer 805 set to the standard legacy SRS timing. However, the contention SRS, such as contention SRS 503, functions as RTS/CTS, which is intended for receipt by the serving gNB, gNB 105a, as well as neighboring gNBs/TRPs, gNBs 105b-105c and UEs 115b-115c. Therefore, the timing applied for contention SRS may be different than the regular uplink timing for legacy SRS.

Additional aspects of the present disclosure may also provide for different UE behaviors that could be specified or implemented upon receiving either legacy or contention-type SRS request, and also among different sub-types of contention SRS (e.g., Type-B-UL, Type-B-DL, Type-B-AL, etc.). For example, a legacy SRS, such as SRS 603, may trigger or allow UE 115b, which transmitted SRS 603 according to this additional aspect, to go into a sleep mode for a particular duration following the transmission of the SRS (because the legacy SRS is not associated with immediate data). Referring to FIG. 8, UE 115 after interpreting the type of SRS via execution of media access logic 802, UE 115, under control of controller/processor 280, accesses trigger behaviors 804 to determine which behavior to execute in response to the particular SRS detected. In another example, a contention-DL SRS, such as contention SRS 503, may trigger or allow the UE to assume that the subsequent slots during a specified time period following the SRS are downlink-centric slots.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 4A-4C may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   selecting, by a base station, a sounding reference signal (SRS) type to request from a served user equipment (UE), the base station and the served UE forming a first communication pair, wherein the SRS type includes one of: a legacy SRS associated with channel measurement sounding, or a contention SRS associated with contention resolution for medium sharing, wherein the legacy SRS is configured to cause a neighboring network node to conduct communications without modification with another network node, and wherein the contention SRS is configured to cause a neighboring network node to modify the communications with the another network node, the neighboring network node and the another network node forming a second communication pair;
   determining, by the base station, an SRS resource for use by the served UE for SRS transmission, wherein the SRS resource is determined based on the served UE and the selected SRS type; and
   transmitting, by the base station, an SRS request to the served UE, wherein the SRS request includes information identifying the determined SRS resource.

2. The method of claim 1, wherein the contention SRS includes one of:
   a downlink contention SRS type;
   an uplink contention SRS type; or
   a bi-directional contention SRS type.

3. The method of claim 2, further including:
   determining, at the base station, to schedule one of: downlink transmission from the base station, uplink transmission from the served UE, or bi-directional communication with the served UE, wherein the selecting the SRS type as the contention SRS includes:
      selecting:
         the downlink contention SRS type when the downlink transmission is determined;
         the uplink contention SRS type when the uplink transmission is determined; and
         the bi-directional contention SRS type when the bi-directional communication is determined.

4. The method of claim 1, further including:
   receiving, by the base station, an SRS on the determined SRS resource from the served UE; and determining, at the base station, to schedule data for one of:
    downlink transmission from the base station, or
    uplink transmission from the served UE,
during a specified period following the SRS, wherein the selecting the SRS type as the contention SRS is performed in response to the determining to schedule the data.

5. The method of claim 1, further including:
failing to receive an SRS by the base station; and
refraining, by the base station, from scheduling data communication with the served UE for a specified period.

6. The method of claim 1, further including:
determining, at the base station, no data to schedule for communication with the served UE during a specified period following the SRS, wherein the selecting the SRS type as the legacy SRS is performed in response to the determining the no data to schedule.

7. The method of claim 1, further including:
determining, by the base station, an SRS resource-type association of the SRS type to the SRS resource; and
communicating, by the base station, the SRS resource-type association with the neighboring network node.

8. The method of claim 7, further including:
communicating, by the base station, the SRS resource-type association with the served UE, wherein the SRS resource determined by the base station for the contention SRS is a common shared SRS resource shared among one or more additional served UEs.

9. A method of wireless communication, comprising:
receiving, at a user equipment (UE) from a base station, a sounding reference signal (SRS) resource-type association identifying an SRS type associated with a corresponding SRS resource, the UE and the base station forming a first communication pair, wherein the SRS type includes one of: a legacy SRS associated with channel measurement sounding, or a contention SRS associated with contention resolution for medium sharing, wherein the legacy SRS is configured to cause a neighboring network node to conduct communications without modification with another network node, and wherein the contention SRS is configured to cause a neighboring network node to modify the communications with the another network node, the neighboring network node and the another network node forming a second communication pair;
receiving, at the UE, an SRS request from a serving base station, wherein the SRS request contains information identifying an SRS resource for SRS transmission; and
transmitting, by the UE, an SRS on the SRS resource identified in the SRS request.

10. The method of claim 9, further including:
receiving, at the UE, configuration of one or more SRS resources, wherein the SRS resource is one of the one or more SRS resources.

11. The method of claim 9, further including:
determining, by the UE, the SRS type based on the SRS resource and the SRS resource-type association.

12. The method of claim 11, further including:
assuming, by the UE, that no communication with the serving base station will occur for a specified period following transmission of a legacy SRS.

13. The method of claim 12, further including:
switching, by the UE, to a sleep mode during the specified period.

14. The method of claim 11, further including:
determining, by the UE, a subtype of the contention SRS based on the SRS resource and the SRS resource-type association, wherein the subtype includes one of: a downlink contention SRS type, an uplink contention SRS type, or a bi-directional contention SRS type.

15. The method of claim 14, further including:
assuming, by the UE, that communication with the serving base station for a specified period following transmission of the SRS is restricted to one of: downlink only, uplink only, or bi-direction as indicated by the subtype of the contention SRS.

16. The method of claim 9, further including:
detecting, by the UE in response to the SRS request requesting the contention SRS of a downlink contention SRS type, that a shared spectrum of the UE is unoccupied for reception, wherein the transmitting the SRS is performed in response to the detecting the shared spectrum is unoccupied.

17. The method of claim 9, further including:
detecting, by the UE in response to the SRS request requesting a contention SRS of a downlink contention SRS type, that a shared spectrum of the UE is occupied for reception; and
refraining from the transmitting the SRS in response to the detecting the shared spectrum is occupied.

18. The method of claim 9, further including:
detecting, by the UE in response to the SRS request requesting a contention SRS of an uplink contention SRS type, that a shared spectrum of the UE is unoccupied for transmission, wherein the transmitting the SRS is performed in response to the detecting the shared spectrum is unoccupied.

19. The method of claim 9, further including:
detecting, by the UE in response to the SRS request requesting a contention SRS of an uplink contention SRS type, that a shared spectrum of the UE is occupied for transmission; and
refraining from the transmitting the SRS in response to the detecting the shared spectrum is occupied.

20. The method of claim 9, wherein the transmitting the SRS as a contention SRS associated with contention resolution for medium sharing is according to one of:
    a first power that is different from a second power associated with transmission of a legacy SRS associated with channel measurement sounding; and
    a first timing that is different from a second timing used with transmission of a legacy SRS associated with channel measurement sounding.

21. The method of claim 20, wherein the first power and the second power are determined based on one or more of: different rules, or separate power control commands, and wherein the first timing and the second timing are determined based on one of: different rules, or separate timing advance commands.

22. A method of wireless communications, comprising:
detecting, at a network node, one or more sounding reference signals (SRS) from one or more non-served user equipment (UE);
determining, by the network node, whether the one or more SRS correspond to one of: legacy SRS associated with channel measurement sounding, or contention SRS associated with contention resolution for medium sharing, wherein the determining is based on an SRS resource carrying the one or more SRS;

conducting communications without modification, by the network node, with another network node based on determining the one or more SRS correspond to the legacy SRS; and modifying communications, by the network node, with the another network node based on determining the one or more SRS correspond to the contention SRS.

23. The method of claim 22, wherein the modifying communications includes one of:

refraining, by the network node, from any communications with the another network node for a predetermined period of time;

beamforming, by the network node, the communications with the another network node to create a spatial null in a spatial direction of the contention SRS; or communicating, by the network node, with the another network node when the another network node is located in a different spatial direction than the spatial direction of the contention SRS.

24. The method of claim 22, further including:

determining, by the network node, a type association identifying an association of an SRS type of one of: a contention type SRS or a legacy type SRS, with a corresponding SRS resource, wherein the determining is based on the type association and the SRS resource; and transmitting, by the network node, the type association to one or more neighboring base stations.

25. The method of claim 22, further including:

receiving, by the network node from one or more neighboring network nodes, a SRS resource-type association identifying an SRS type associated with the SRS resource, wherein the SRS type includes one of: a legacy SRS associated with channel measurement sounding, or a contention SRS associated with contention resolution for medium sharing.

26. The method of claim 25, wherein determining SRS type is based on the SRS resource and the SRS resource-type association.

27. The method of claim 26, wherein the modifying communications includes:

estimating, by the network node, that the communications with the another network node does not interfere in a spatial direction of the contention SRS when the SRS resource is identified as associated with the downlink transmission grant; and transmitting downlink signals from the network node to the another network node.

28. The method of claim 26, wherein the modifying communications includes:

estimating, by the network node, that the communications with the another network node is in another spatial direction from the contention SRS when the SRS resource is identified as associated with the uplink transmission grant; and receiving uplink signals at the network node from the another network node.

29. The method of claim 22, wherein the determining the one or more SRS corresponds to the contention SRS includes identifying, by the network node, the SRS resource is associated with carrying a contention type SRS.

30. The method of claim 22, wherein the detecting the one or more SRS includes:

measuring, by the network node, a total received energy level of the one or more SRS corresponding to the contention SRS, wherein the one or more SRS corresponding to the contention SRS are detected on a single SRS resource.

* * * * *